UNITED STATES PATENT OFFICE.

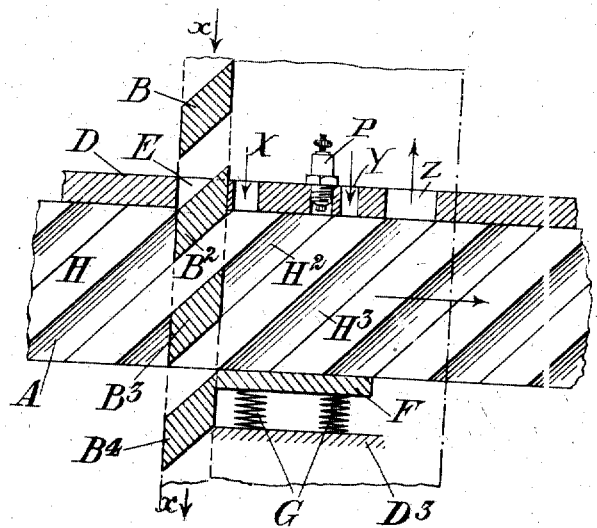

JAMES MAUDSLAY SANDERS, OF KEYNSHAM, NEAR BRISTOL, ENGLAND.

ROTARY ENGINE.

1,220,688. Specification of Letters Patent. Patented Mar. 27, 1917.

Application filed February 5, 1917. Serial No. 146,828.

*To all whom it may concern:*

Be it known that I, JAMES MAUDSLAY SANDERS, a subject of the King of England, residing at Keynsham, near Bristol, England, have invented certain new and useful Improvements in Rotary Engines, of which the following is a specification.

This invention relates to rotary engines of the kind in which a grooved worm wheel is engaged by a toothed wheel.

This invention comprises a grooved worm wheel a sector of which is cased at the sides by a stationary casing and on its periphery by an axial extension of a toothed wheel which gears with the grooved wheel, the gases expanding in the grooves between the teeth of the worm wheel between one side of the casing and a tooth of the toothed wheel.

In the accompanying drawings,

Fig. 2 is a plan with the cover removed, while

Fig. 3 is a diagram illustrating the operation, with the worm wheel developed.

Like letters indicate like parts throughout the drawings.

Figure 1:
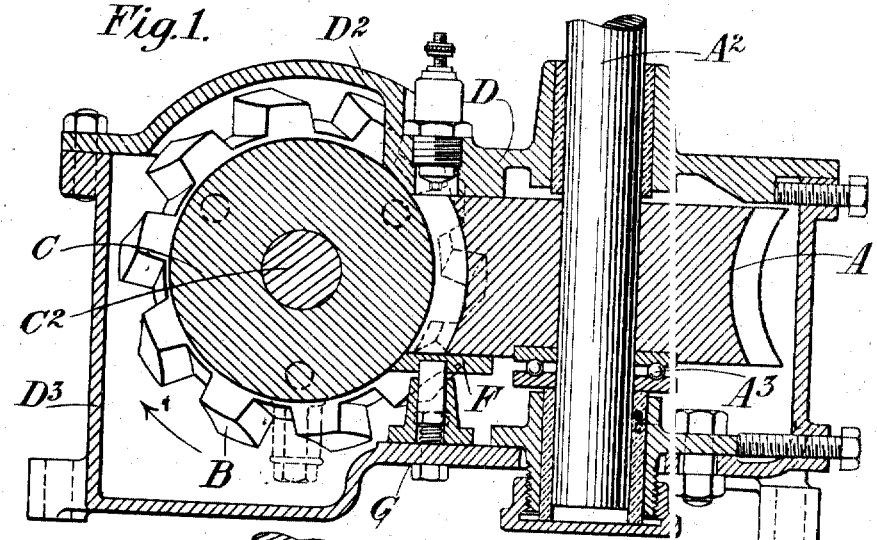
Figure 1 is a central vertical section.
Figure 2:
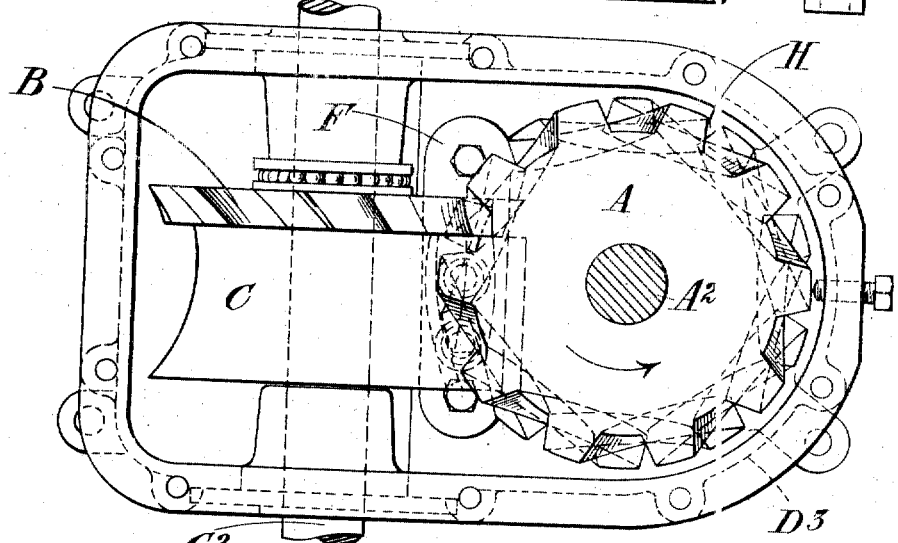

In this rotary engine, A is a worm wheel provided with helical or other similar grooves in its periphery. With these grooves engage teeth B on the toothed wheel C, and it will be clear that the two wheels A and C revolve relatively to one another after the manner of a pair of worm wheels. The shaft $A^2$ carrying the worm wheel A is adjustable toward the shaft $C^2$ to vary and adjust the mesh of the teeth, and a thrust bearing is fitted at $A^3$ to take the thrust reaction due to the explosion pressure. The wheel A bears up against the underside of a bar or plate which in the construction illustrated is constituted by the part D of the cover $D^2$ which is fitted to the box $D^3$ carrying the bearings and inclosing the wheels, which run in oil contained in the box. The plate D is provided with a slot at E through which the teeth B pass immediately prior to meshing with the grooves in the worm wheel A. The plate D is also provided with an inlet port X, a sparking plug P, a water inlet Y, and an exhaust outlet Z, as indicated clearly in Fig. 3.

On the underside a plate F is pressed up by springs G against the worm wheel A so as to seal the underside of the grooves in the periphery of the wheel A for a suitable angle, and the plain extension of the wheel C seals the face of the grooves.

The method of operation can be easily understood with reference to the diagram shown in Fig. 3. Assuming the wheel C carrying the teeth B to rotate in the direction of the arrow $x$ (Fig. 3) the tooth $B^2$ will pass through the slot E in the plate D and enter the groove H in the periphery of the worm wheel A. Farther movement brings the top of the groove H under the inlet port when a volume of combustible gas under high pressure enters the groove above the tooth $B^2$. Further rotation brings the top of the groove, which we will now assume to be the groove $H^2$, beneath the sparking plug so that the tooth now assumed to be $B^3$ receives pressure. After a slight further movement the top of the groove comes under the water inlet so that water injected into the heated groove cools this and by being flashed into steam maintains the pressure. Eventually the tooth passes out of the groove as shown at $B^4$, and by this time the groove, which is assumed to be that marked $H^3$, is sealed at the bottom by the plate F while the top communicates with the exhaust outlet. The gases thus escape except for a small residue which is swept out the next time the groove is entered by a tooth. In the same way the oil entering the groove is dislodged in advance of the entering tooth.

Preferably the metals selected for the construction of the different parts have different coefficients of expansion so as to maintain the same clearance between the teeth and the grooves as the parts heat up.

By this means a very simple construction of internal combustion engine can be produced, with only two moving parts, apart from the compressor supplying the gas. If desired, the wheel A may be engaged at more than one point by a wheel such as C so that it is subjected to pressure at more than one point. Further the two wheels A and C need not be of the same dimensions so that they can rotate at different speeds.

Or other suitable means may be employed to obtain the same action, *i. e.* the teeth B may be arranged to mesh with the grooves H on the center line or otherwise as convenient, or the port positions of the plate D may be varied. Fig. 3 only indicates the method employed.

What I claim as my invention and desire to secure by Letters Patent is:—

1. In a rotary internal combustion engine, a grooved worm wheel, a stationary casing inclosing a sector of said worm wheel, a toothed wheel gearing with said worm wheel, and an axial extension on said toothed wheel incasing the periphery of the worm wheel, all so arranged that the gases expand in chambers formed by the teeth of the worm wheel, one side of the casing and the teeth of the toothed wheel.

2. In a rotary internal combustion engine, a grooved worm wheel, a stationary casing consisting of a slotted plate with inlet and exhaust ports therein and an ignition device, said plate inclosing a sector of said worm wheel, a toothed wheel gearing with said worm wheel, and an axial extension on said toothed wheel incasing the periphery of the worm wheel, all so arranged that the gases expand in chambers formed by the teeth of the worm wheel, one side of the casing and the teeth of the toothed wheel.

3. In a rotary internal combustion engine, a grooved worm wheel, a stationary casing consisting of a slotted plate with inlet and exhaust ports therein and an ignition device, said plate inclosing a sector of said worm wheel, a toothed wheel gearing with said worm wheel, an axial extension on said toothed wheel incasing the periphery of the worm wheel and a supplementary spring loaded plate pressing against the side of the worm wheel remote from the slotted plate, all so arranged that the exhaust discharges from a chamber formed by the teeth of the worm wheel, the slotted plate and the spring pressed plate.

4. In a rotary internal combustion engine, a grooved worm wheel, a stationary casing consisting of a slotted plate with inlet, exhaust and water ports therein and an ignition device, said plate inclosing a sector of said worm wheel, a toothed wheel gearing with said worm wheel, an axial extension on said toothed wheel incasing the periphery of the worm wheel, a supplementary spring loaded plate pressing against the side of the worm wheel remote from the slotted plate and means for injecting water through the water port, for the purpose described.

In testimony whereof I have signed my name to this specification in the presence of two subscribing witnesses.

JAMES MAUDSLAY SANDERS.

Witnesses:
WILLIAM FREDERICK WILKINS,
ARTHUR EDWARD BLANDFORD.